United States Patent
Matsumoto

(10) Patent No.: US 10,733,062 B2
(45) Date of Patent: Aug. 4, 2020

(54) SOFTWARE STORAGE UNIT, BACKUP METHOD, AND RECORDING MEDIUM STORING BACKUP CONTROL PROGRAM

(71) Applicant: NEC Corporation, Minato-ku, Tokyo (JP)

(72) Inventor: Kouichi Matsumoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/771,112

(22) PCT Filed: Nov. 18, 2016

(86) PCT No.: PCT/JP2016/084195
§ 371 (c)(1),
(2) Date: May 1, 2018

(87) PCT Pub. No.: WO2017/090517
PCT Pub. Date: Jun. 1, 2017

(65) Prior Publication Data
US 2018/0322018 A1    Nov. 8, 2018

(30) Foreign Application Priority Data
Nov. 24, 2015   (JP) ................................. 2015-228585

(51) Int. Cl.
*G06F 3/06* (2006.01)
*G06F 11/14* (2006.01)

(52) U.S. Cl.
CPC .......... *G06F 11/1464* (2013.01); *G06F 3/067* (2013.01); *G06F 3/0613* (2013.01);
(Continued)

(58) Field of Classification Search
CPC ............. G06F 11/1458; G06F 11/1464; G06F 11/1456; G06F 3/0644; G06F 3/0655;
(Continued)

(56) References Cited

U.S. PATENT DOCUMENTS

| 2004/0034672 A1* | 2/2004 | Inagaki ............... G06F 11/1464 |
| 2006/0143503 A1* | 6/2006 | Shaik ..................... G06F 3/061 714/6.2 |

(Continued)

FOREIGN PATENT DOCUMENTS

| JP | 2007-102550 A | 4/2007 |
| JP | 2007-122167 A | 5/2007 |
| JP | 2014-178827 A | 9/2014 |

OTHER PUBLICATIONS

Hao Cheng, A Service-Oriented Approach to Storage Backup, 2008, IEEE International Conference on Services Computing. (Year: 2008).*

(Continued)

*Primary Examiner* — Khoa D Doan

(57) ABSTRACT

The present invention provides a software storage unit, a backup method, and a backup control program capable of completing data transfer to a data backup destination in a shorter time. The software storage unit includes a software storage section constructed across a plurality of physical machines and a switch section coupled to an external network, wherein the software storage section grasps data to back up, among stored data, which is to be transferred to a data backup destination, splits the grasped data into a plurality of data parts, and issues a command to transfer the split data parts from respective ones of the plurality of physical machines to the data backup destination via the switch section.

10 Claims, 9 Drawing Sheets

(52) U.S. Cl.
CPC ............ *G06F 3/0644* (2013.01); *G06F 11/14* (2013.01); *G06F 11/1451* (2013.01)

(58) Field of Classification Search
CPC ...... G06F 3/0646; G06F 3/0647; G06F 3/065; G06F 3/0683; G06F 3/0688; G06F 3/0689
See application file for complete search history.

(56) References Cited

U.S. PATENT DOCUMENTS

| | | | | | |
|---|---|---|---|---|---|
| 2008/0114932 | A1* | 5/2008 | Kobayashi | ............. | G06F 3/061 711/114 |
| 2008/0301763 | A1* | 12/2008 | Sasaki | ................... | G06F 3/065 726/1 |
| 2009/0037555 | A1* | 2/2009 | Ueno | .................. | G06F 3/0604 709/213 |
| 2014/0229695 | A1* | 8/2014 | Dinkar | ............... | H04L 67/1004 711/162 |
| 2015/0324255 | A1* | 11/2015 | Kochunni | ........... | G06F 11/1448 711/162 |
| 2016/0255138 | A1* | 9/2016 | Akimoto | ........... | G06F 15/17387 709/217 |

OTHER PUBLICATIONS

Mao Jing-Fang, Technical Research of Storage and Backup System in Stated-Owned Enterprise. 2010 Third International Symposium on Information Processing (pp. 481-482). IEEE (Year: 2010).*

A. Javidan, T. Angerilli, A. Barhashary, G. Lemieux, R. Lisagor and M. Ripeanu, "vanDisk: An Exploration in Peer-To-Peer Collaborative Back-Up Storage," 2007 Canadian Conference on Electrical and Computer Engineering, Vancouver, BC, 2007, pp. 219-222. (Year: 2007).*

International Search Report for PCT Application No. PCT/JP2016/084195, dated Feb. 21, 2017.

English translation of Written opinion for PCT Application No. PCT/JP2016/084195.

* cited by examiner

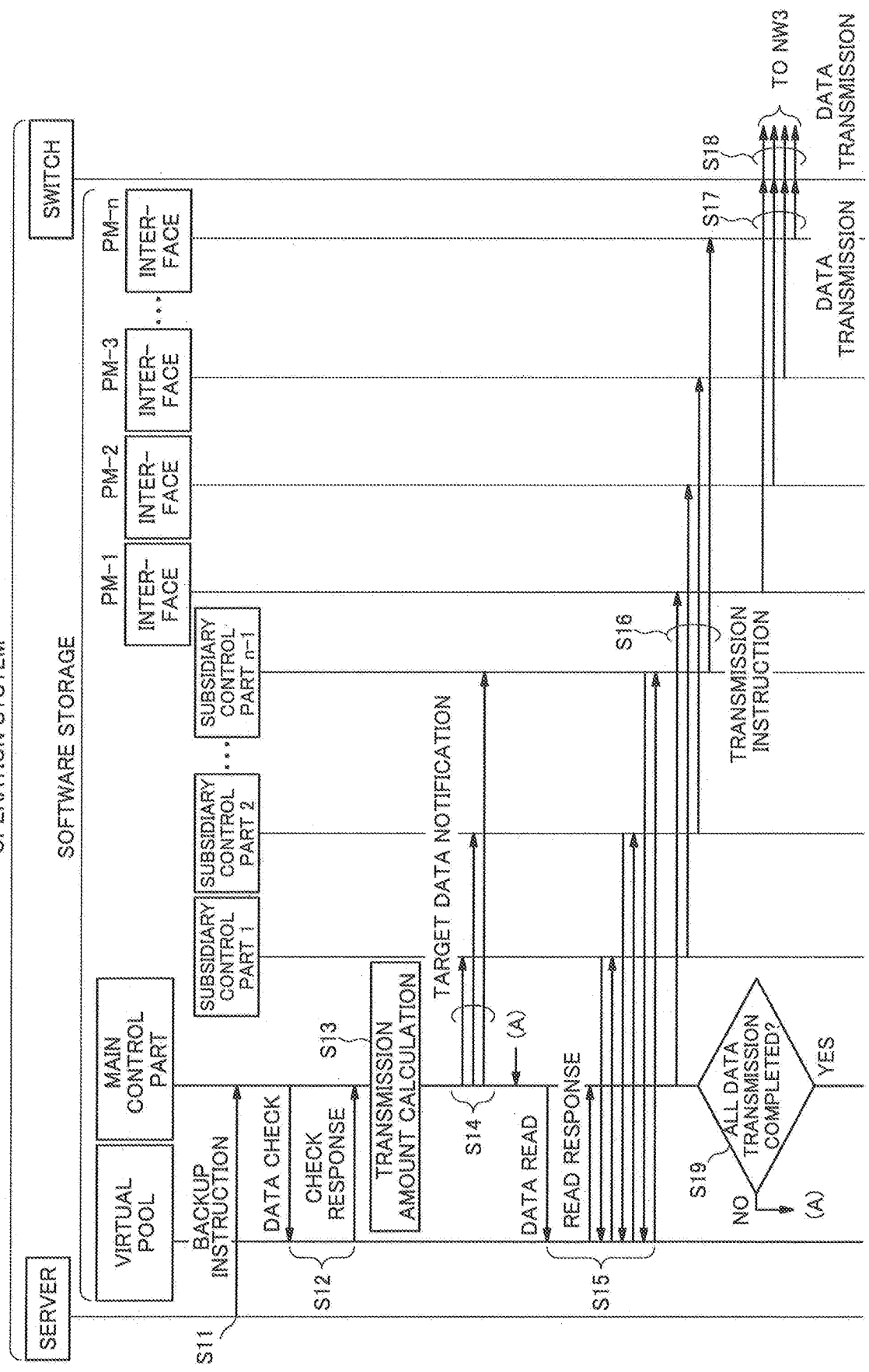

SOFTWARE STORAGE UNIT, BACKUP METHOD, AND RECORDING MEDIUM STORING BACKUP CONTROL PROGRAM This application is a National Stage Entry of PCT/JP2016/084195 filed on Nov. 18, 2016, which claims priority from Japanese Patent Application 2015-228585 filed on Nov. 24, 2015, the contents of all of which are incorporated herein by reference, in their entirety.

TECHNICAL FIELD

The present invention relates to a software storage unit, a backup method and a recording medium storing a backup control program, and in particular, relates to data backup using a storage.

BACKGROUND ART

In recent years, great importance has been placed on backup of data used in an operation system, as a countermeasure not only against system troubles or failures but also against disasters. Accordingly, a system is configured to be provided with a backup system separately from an operation system, and data used in the operation system is backed up into the backup system. The system is thereby enabled to continue operation even when, by any chance, operation of the operation system becomes difficult to continue owing to its system trouble or failure or owing to a disaster, by starting up the backup system as an operation system using the backup data and thereby recovering the system.

There is a system in which a backup system is connected with an operation system via a network and, in preparation for a case where operation of the operation system becomes difficult to continue owing to its system trouble, failure or the like, backup transfer of data to the backup system is performed on the operation system. In the system, storages each using an HDD (Hard Disk Drive) or an SSD (Solid State Drive) are employed for storing data, and data stored in a storage on the operation system side is transferred to a storage on the backup system side via the network.

A description will be given of such a system of background art where the backup transfer is performed. A system shown in FIG. 8 includes an operation system 100, a backup system 200, and a network 300 connecting the operation system 100 and the backup system 200. The operation system 100 includes a storage 101, a server 102 and a switch 103. As shown in FIG. 9, the storage 101 has a configuration including, within a storage 400, an interface unit 401, a control unit 402 and an above-described HDD or SSD 403. The backup system 200 includes a storage 201, a server 202 and a switch 203.

Next, a description will be given of a data backup technique from the storage 101 of the operation system 100 to the backup system 200 in FIG. 8. In the data backup technique using the storage 101 of background art, data to back up has been written into the storage 101 constituting the operation system 100. Then, according to a command from the storage 101 or the server 102, data transmission of the data written in the storage 101 to the storage 201 of the backup system 200 is performed. The data transmission is performed via the switch 103 constituting the operation system 100, the network 300 and the switch 203 constituting the backup system 200. By such data transmission, data in the operation system 100 can be backed up into the backup system 200.

Patent Literature 1 (PTL1) relates to a computer system, and describes that, for data backup, a method of storing into a disc device or a magnetic tape device connected to a computer system and a method of storing into another computer via a network are used.

CITATION LIST

Patent Literature

[PTL1] Japanese Laid-Open Patent Application No. 2007-102550

SUMMARY OF INVENTION

Technical Problem

However, the data backup technique using a storage, of the background art, has issues described below.

A first issue is that a very long time is necessary for reading all the data and completing transfer of the data to the backup system. Recently, there has been increase in the number of systems whose total amount of data to back up is larger than about a few terabytes (TB). Here, it is assumed that, in a system whose total amount of data to back up is very large, data of an amount as large as a few terabytes in a storage using an HDD is read and transferred. In that case, I/O (Input/Output) performance (IOPS) of the HDD is as low as at most several hundred IOPS, and performance of reading data from the storage also becomes low. There accordingly is an issue in that a time as long as a few tens of minutes to a few hours is necessary for reading all the data and completing transfer of the data to the backup system.

A second issue is that, while it is considered, as a measure against the first issue, to use an SSD having higher I/O performance than an HDD in place of the HDD, a very long time is still necessary even though the time is not so long as in the case of the storage using an HDD. A method of employing a storage using an SSD capable of yielding a few tens of thousand to a hundred thousand IOPS can be considered, but when throughput performance of an interface of the storage using an SSD is low, the interface's throughput performance becomes a bottleneck. There accordingly is an issue in that a time as long as a few minutes to a few tens of minutes is necessary for reading all the data and completing transfer of the data to the backup system even though the time is not so long as in the case of the storage using an HDD of the background art.

An objective of the present invention is to provide a software storage unit, a backup method and a recording medium storing a backup control program where throughput performance is improved so as to enable to complete data transfer in a shorter time.

Solution to Problem

To achieve the above-mentioned object, a software storage unit according to the present invention comprises: a software storage section constructed across a plurality of physical machines; and a switch section to be connected to an external network, wherein the software storage section is configured to identify backup target data to be transferred to a data backup destination among data stored therein, split the identified data into a plurality of data parts, and issue a command to transfer the split data parts from respective ones of the plurality of physical machines to the data backup destination via the switch section.

In addition, a data backup method according to the present invention comprises: splitting backup target data into a plurality of data parts when transferring the backup target data to a data backup destination, the backup target data being data to back up among data stored in a software storage constructed across a plurality of physical machines; and transferring the split data parts from respective ones of the plurality of physical machines to the data backup destination.

In addition, a recording medium storing a backup control program according to the present invention performs control to transfer backup target data to a backup destination, the backup target data being data to back up among data stored in a software storage constructed across a plurality of physical machines, the backup control program causes a computer to execute:

a process of identifying the backup target data to be transferred to the data backup destination;

a process of splitting the identified data into a plurality of data parts; and a process of issuing a command to transfer the split data parts from respective ones of the plurality of physical machines to the data backup destination.

Advantageous Effect of Invention

According to the present invention, it is possible to realize a backup technique which enables to complete data transfer to a data backup destination in a shorter time and to achieve improved throughput performance.

BRIEF DESCRIPTION OF DRAWINGS

FIG. 6 is a sequence chart for illustrating a backup method according to the second example embodiment of the present invention.

DESCRIPTION OF EMBODIMENTS

Figure 1:
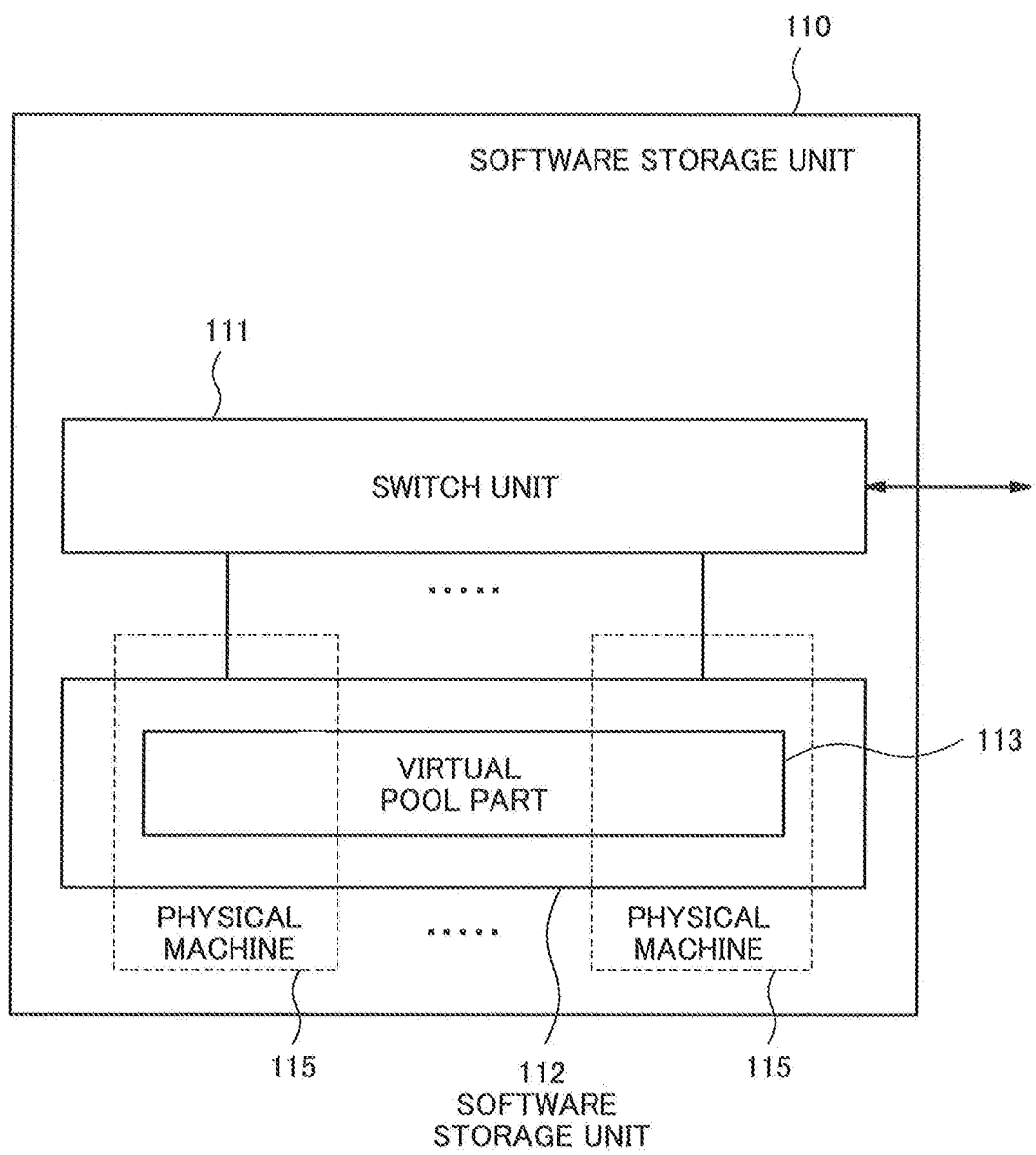
FIG. 1 is a configuration diagram for illustrating a software storage unit according to an example embodiment of a broadest concept of the present invention.

Hereinafter, preferable example embodiments of the present invention will be described in detail, with reference to drawings. FIG. 1 is a configuration diagram for illustrating a software storage unit according to an example embodiment of a broadest concept of the present invention. Here, directions of arrows in drawings shown below are illustrated as merely an example but not as the ones restricting signal directions between blocks.

A software storage unit 110 of FIG. 1 includes a software storage unit 112 constructed across a plurality of physical machines 115, and a switch unit 111 connected to an external network. The software storage unit 112 identifies, among data stored in it, backup target data which is to be transferred to a data backup destination, and splits the identified data into a plurality of data parts. Further, the software storage unit 112 issues a command to transfer the split data parts respectively from the plurality of physical machines to the data backup destination via the switch unit 111. Here, the software storage unit 112 includes a virtual pool part 113 for storing data.

When transferring data stored in the software storage unit 112 to an external data backup destination, the software storage unit 110 of FIG. 1 identifies backup target data which is to be transferred, and splits the identified data into a plurality of data parts. Further, the software storage unit 110 transfers the split data parts respectively from the plurality of physical machines 115 to the data backup destination.

In the software storage unit 110 of FIG. 1, high throughput performance can be achieved by using interfaces of the plurality of physical machines, which are employed as bases of the software storage unit 112, for data transmission in the backup operation. Further, the capability of achieving high throughput performance as a software storage enables to complete the backup operation in a short time even when a total amount of backup target data is large. Hereinafter, more specific example embodiments of the present invention will be described.

First Example Embodiment

Figure 2:
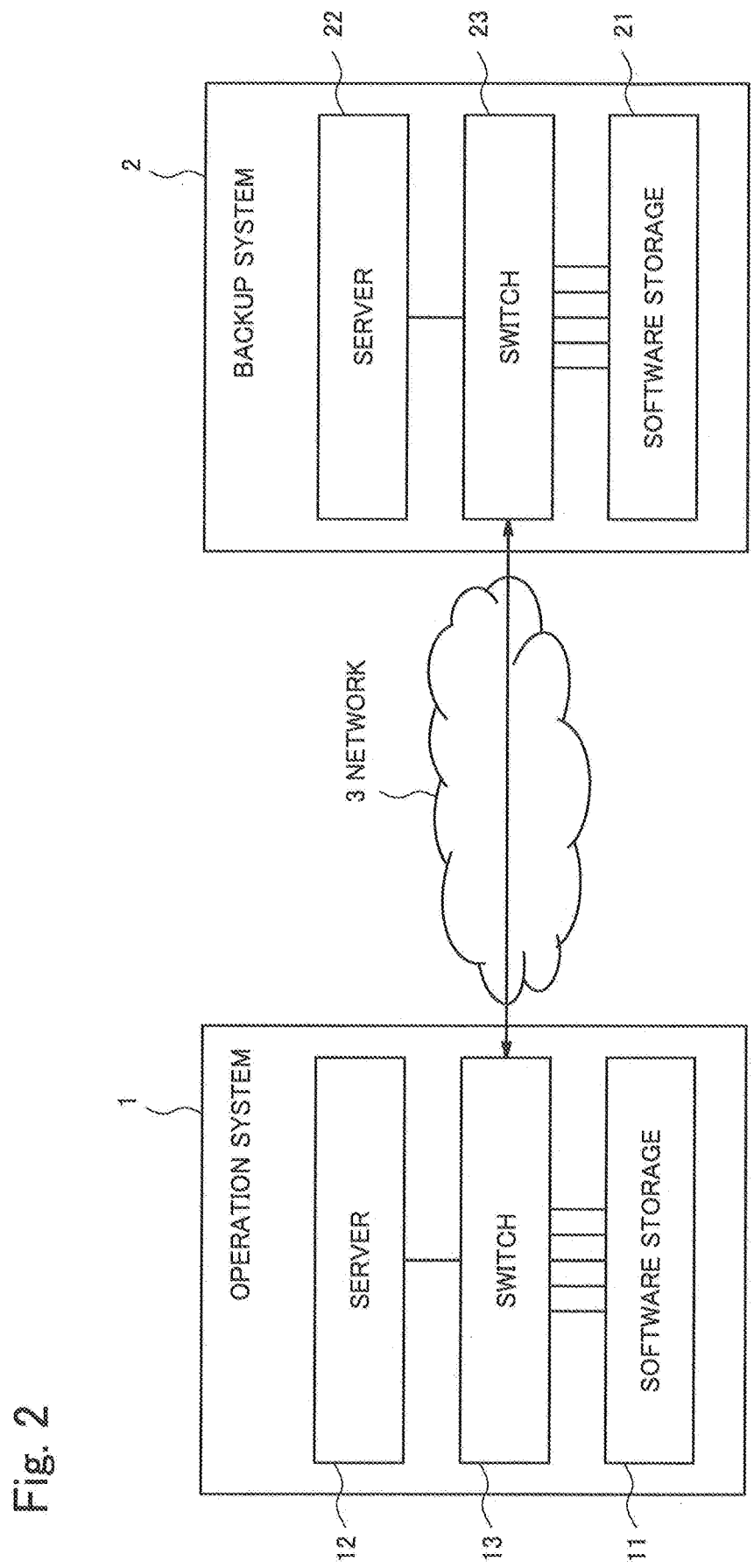
FIG. 2 is a block diagram for illustrating a system according to an example embodiment of the present invention to which a backup method according to an example embodiment of the present invention is applied.
Figure 3:
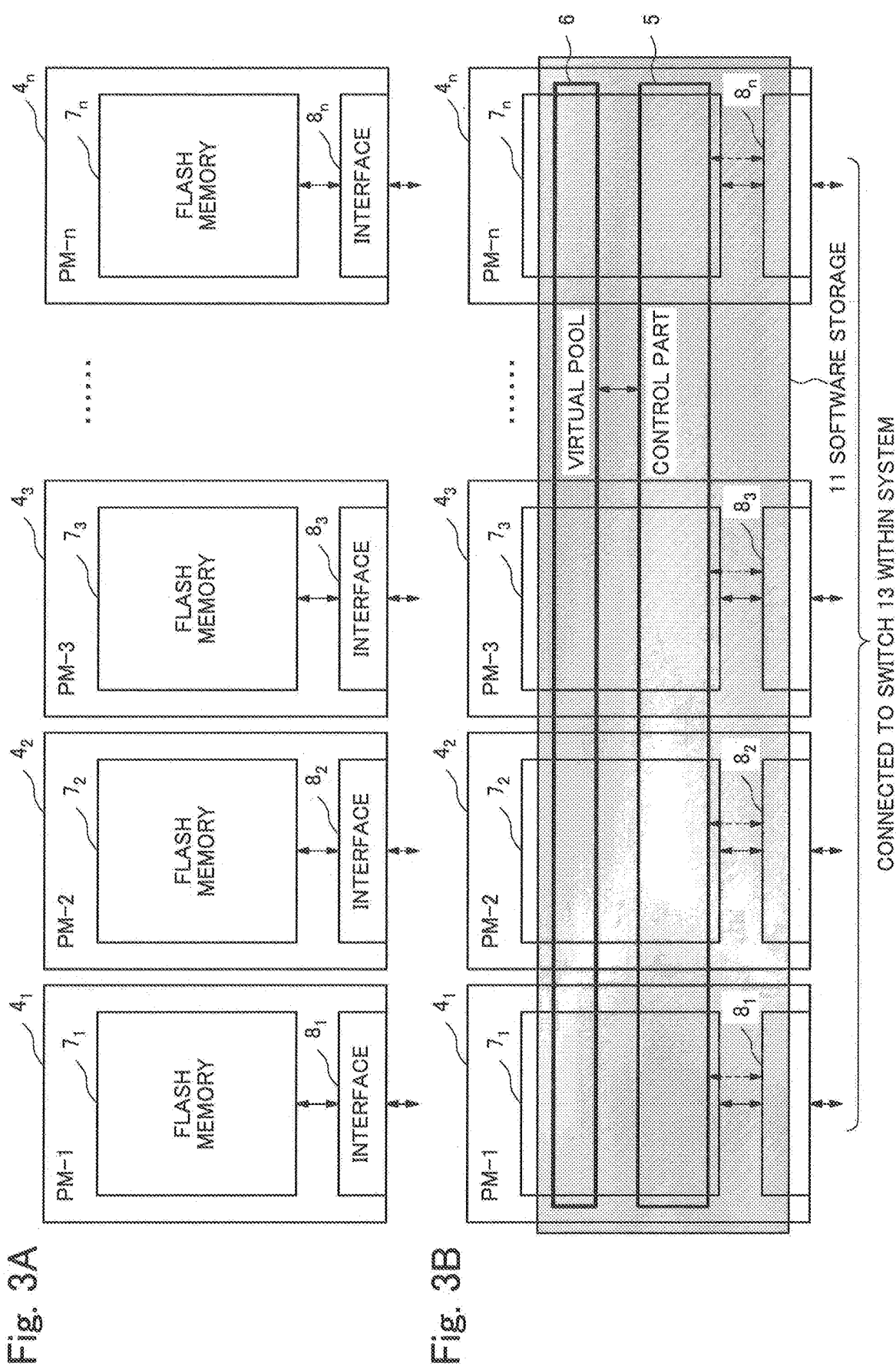
FIGS. 3A and 3B are block diagrams for illustrating details of a software storage in an operation system according to a first example embodiment of the present invention.
Figure 4:
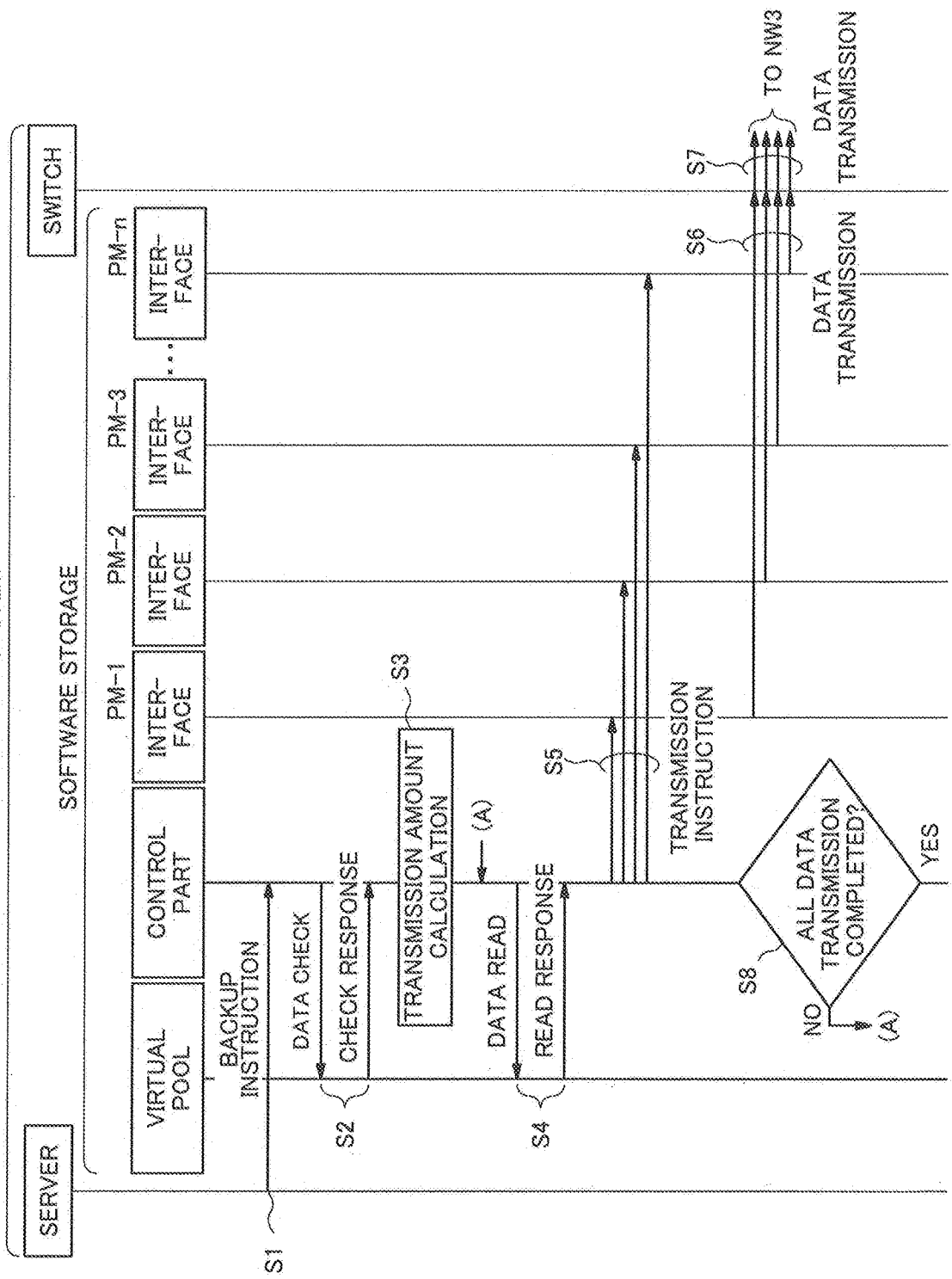
FIG. 4 is a sequence chart for illustrating a backup method according to the first example embodiment of the present invention.

First, a description will be given of a software storage unit and a backup method according to a first example embodiment of the present invention. FIG. 2 is a block diagram for illustrating a system according to an example embodiment of the present invention to which a backup method according to an example embodiment of the present invention is applied. FIGS. 3A and 3B are block diagrams for illustrating details of a software storage in an operation system according to the first example embodiment of the present invention. FIG. 4 is a sequence chart for illustrating a backup method according to the first example embodiment of the present invention.

(Configuration)

The system shown in FIG. 2 includes an operation system 1, a backup system 2, and a network 3 connecting the operation system 1 and the backup system 2. The operation system 1 includes a software storage 11, a server 12, and a switch 13 connected to the network 3. The backup system 2 includes a software storage 21, a server 22, and a switch 23 connected to the network 3.

In FIG. 2, the software storage 11 of the operation system 1 stores data operated in the operation system 1. In other words, the software storage 11 of the operation system 1 writes data used in the operation system from the server 12 into itself and accordingly stores the data. The software storage 11 transfers the data stored in itself to the software storage 21 of the backup system 2, via the switch 13, the network 3 and the switch 23 of the backup system 2.

In FIGS. 3A and 3B, the software storage 11 is constructed by installing software across n-number of physical machines (PMs). Hereafter, the n-number of physical machines (PMs) will be denoted as n-number of physical machines (PM-1 to PM-n) $4_1$ to $4_n$. Here, n may be any natural number equal to or larger than 2.

As shown in FIG. 3A, FIG. 3(a), the physical machines (PM-1 to PM-n) $4_1$ to $4_n$ include, respectively, flash memories $7_1$ to $7_n$ each storing data, and also include, respectively, interfaces $8_1$ to $8_n$ each inputting and outputting data.

The software storage 11 includes a virtual pool 6 and a control part 5 both constructed across the n-number of physical machines (PM-1 to PM-n) $4_1$ to $4_n$. The virtual pool 6 is created on the flash memories $7_1$ to $7_n$ provided in the n-number of physical machines (PM-1 to PM-n) $4_1$ to $4_n$, according to a user's issuing a command to the control part 5 of the software storage 11. On the software storage 11, the user issues the command to the control part 5 of the software storage 11 and thereby creates the virtual pool 6 by the use of the flash memories $7_1$ to $7_n$ provided in the n-number of physical machines (PM-1 to PM-n) $4_1$ to $4_n$. In the virtual pool 6 of the software storage 11, data used in the operation system 1 is stored.

The physical machine $4_1$ is of a hardware configuration including the flash memory $7_1$ having higher I/O performance than that of an HDD or an SSD, and the interface $8_1$ having about the same throughput performance as that of the interface of the storage of the background art. While the hardware configuration of the physical machine $4_1$ further includes a central processing unit (CPU) that constitutes a commercial server and the like, only the flash memory $7_1$ and the interface $8_1$ are illustrated, for convenience of explanation. The other physical machines (PM-2 to PM-n) $4_2$ to $4_n$ are of the same configuration as that of the physical machine (PM-1) $4_1$, that is, they each have a configuration including a corresponding one of the flash memories $7_2$ to $7_n$ and a corresponding one of the interfaces $8_2$ to $8_n$ and, additionally, a CPU that constitutes a commercial server, and the like.

When backing up data stored in the operation system 1 into the backup system 2, the control part 5 of the software storage 11 inquires of the virtual pool 6 about a total amount of backup target data. As a trigger of the inquiry, a command from a user, a command from the server 12 or a timing set to the software storage 11 can be considered.

A data volume obtained by dividing the total amount of backup target data having been acquired as a result of the inquiry by the number of the physical machines (PM-1 to PM-n) n is determined to be a data amount to be transmitted by each of the interfaces $8_1$ to $8_n$ of the respective physical machines (PM-1 to PM-n) $4_1$ to $4_n$. Next, the backup target data is read from the virtual pool 6, and the read data is split by the data amount whose transmission is to be performed by each of the interfaces $8_1$ to $8_n$ of the respective physical machines (PM-1 to PM-n) $4_1$ to $4_n$.

Then, a command to transmit data is issued to each of the interfaces $8_1$ to $8_n$, and the data parts split for the respective interfaces $8_1$ to $8_n$ are handed over to the respective interfaces $8_1$ to $8_n$. Thereby, data used in the operation system 1 which is stored in the virtual pool 6 is transmitted concurrently from each of the interfaces $8_1$ to $8_n$ of the physical machines (PM-1 to PM-n) $4_1$ to $4_n$. In other words, each of the interfaces $8_1$ to $8_n$ of the physical machines (PM-1 to PM-n) $4_1$ to $4_n$ starts data transmission toward the software storage 21 of the backup system 2 concurrently at the same timing.

The data stored in the virtual pool 6 of the software storage 11 which has been transmitted from the interfaces $8_1$ to $8_n$ of the physical machines (PM-1 to PM-n) $4_1$ to $4_n$ is transferred to the software storage 21 of the backup system 2. The transfer of the data stored in the virtual pool 6 is performed via the switch 13 of the operation system 1, the network 3, and the switch 23 of the backup system 2. The data stored in the virtual pool 6 is transferred to the software storage 21 of the backup system 2 and is written into a virtual pool of the software storage 21. The backup operation ends when all the data stored in the virtual pool 6 of the software storage 11 is transmitted and writing of all the data into the virtual pool of the software storage 21 is completed.

In the data transmission described above, the throughput performance of the software storage is improved as a whole by concurrently transmitting the same volume of data from respective ones of the interfaces $8_1$ to $8_n$.

Accordingly, it is possible to provide a backup technique with improved throughput performance of data transfer, even when a total amount of backup target data is of a larger volume than about a few terabytes (TB). Improvement in throughput performance of data transfer can be realized by using the interfaces $8_1$ to $8_n$ of the n-number of physical machines (PM-1 to PM-n) $4_1$ to $4_n$, across which the software storage 11 is installed, in a manner to concurrently perform data transmission from respective ones of the interfaces $8_1$ to $8_n$.

Here, a point of the above-described splitting of the amount of backup target data is to perform data splitting and, therefore, the splitting may be either that into equal amounts or that into approximately equal amounts. However, because data is concurrently transmitted from each of the interfaces $8_1$ to $8_n$, throughput performance of the data transfer becomes highest when the splitting is performed to create equal data amounts.

(Operation)

Next, using a sequence chart shown in FIG. 4, operation of the backup technique of the present example embodiment will be described in detail.

Here, a description will be given of operation since a command to perform data backup is issued from the server 12 of the operation system 1 to the control part 5 of the software storage 11 until data transmission toward the software storage 21 of the backup system 2 is performed. That is, the description will be given of operation in which, taking the above-described data backup instruction as a trigger, the interfaces $8_1$ to $8_n$ of the physical machines (PM-1 to PM-n) $4_1$ to $4_n$, each having received from the control part 5 a command to perform data transmission, receive data from the control part 5 having read data stored in the virtual pool 6, and performs data transmission concurrently at the same timing.

In a case where the backup instruction is issued from a user, operation performed after the issue of the command is the same and, accordingly, a description of that case will be omitted. Further, while FIG. 4 illustrates a technique of backing up data from the operation system 1 into the backup system 2, data backup from the backup system 2 into the operation system 1 also is possible in the present system. That data backup may be enabled by making the backup system 2 include a similar configuration to the n-number of physical machines (PM-1 to PM-n) $4_1$ to $4_n$ of the operation system 1 and constructing the software storage 21 to include a virtual pool and a control part, both being similar to the already described ones, such that they are installed across n-number of physical machines. Operation of a technique for such backup in the reverse direction is the same and, accordingly, its description also will be omitted. Further, in a case where timing to perform data backup has been set in the software storage 11, operation performed after the timing is the same and, accordingly, a description of operation in that case also will be omitted.

First, to the control part 5 of the software storage 11, the server 12 of the operation system 1 transmits a backup instruction to transmit data stored in the virtual pool 6 of the software storage 11 to the software storage 21 of the backup system 2 (S1).

The control part 5 having received the backup instruction transmits a data check to the virtual pool 6 in order to identify where in the virtual pool 6 and in what amount the backup target data is stored. The virtual pool 6 having received the data check replies, in a check response, an amount of the backup target data (S2).

The control part 5 having received the check response identifies a storage area and a total amount of the backup target data, and calculates a volume by dividing the total amount of backup target data by the number of all physical machines (PM-1 to PM-n) n (S3). The calculated volume is a data amount whose transmission is to be performed by each of the interfaces $8_1$ to $8_n$.

Subsequently, the control part 5 transmits a data read to the virtual pool 6 and, through a read response from the virtual pool 6, acquires the backup target data (S4). At the present stage, it is not necessary for the control part 5 to confirm whether all the backup target data has been acquired. Then, the control part 5 splits the backup target data having been read from the virtual pool 6, in order to cause parts of the data to be transmitted from respective ones of the interfaces $8_1$ to $8_n$ of the physical machines (PM-1 to PM-n) $4_1$ to $4_n$. Further, to each of the interfaces $8_1$ to $8_n$ of the physical machines (PM-1 to PM-n) $4_1$ to $4_n$, the control part 5 issues a data transmission instruction and hands over a corresponding one of the data parts having been split for the respective interfaces $8_1$ to $8_n$ (S5).

The interfaces $8_1$ to $8_n$ of the physical machines (PM-1 to PM-n) $4_1$ to $4_n$ having received the transmission instruction concurrently start data transmission to a designated transmission destination (S6). The switch 13 of the operation system 1 transmits the data having been received from the interfaces $8_1$ to $8_n$ of the physical machines (PM-1 to PM-n) $4_1$ to $4_n$, to the network 3, destining the data for the software storage 21 of the backup system 2 (S7).

Subsequently, the control part 5 of the software storage 11 checks whether all the backup target data has been read from the virtual pool 6 of the software storage 11 and the transmission instruction has been issued to respective ones of the interfaces $8_1$ to $8_n$ (S8). The present system is configured such that, at the present stage, the control part 5 confirms whether all the backup target data has been read from the virtual pool 6. At the same time, the control part 5 confirms whether the issuing of the transmission instruction (S5) has been surely performed. By saving states of whether it has issued the transmission instruction to respective ones of the interfaces $8_1$ to $8_n$, the control part 5 can check whether it has issued the transmission instruction to respective ones of the interfaces $8_1$ to $8_n$. According to the check, if transmission of the entire backup target data has not been completed yet, the control part 5 proceeds to (A) of the sequence, performs the operations of S4 to S7, and checks again whether transmission of the entire backup target data has been completed. According to the check, if the transmission has not been completed yet, the operations of S4 to S8 are repeatedly performed and, when completion of the transmission of the entire backup target data is confirmed, the backup operation ends. In the above-described way, all the data in the virtual pool 6 of the software storage 11 is transmitted, and writing of the data into the virtual pool of the software storage 21 is completed.

Advantageous Effects

As has been described above, in the software storage unit and the backup method of the present example embodiment, advantageous effects described below are achieved.

A first effect is that, by using, for data transmission in backup operation, each of the interfaces of the n-number of physical machines configured to be bases of the software storage, it becomes possible to yield high throughput performance in terms of a software storage.

A second effect is that, as a result of the capability of yielding high throughput performance in terms of a software storage, it is possible to complete backup operation in a shorter time than a storage of the background art even when a total amount (volume) of backup target data is large.

Second Example Embodiment

Figure 5A:
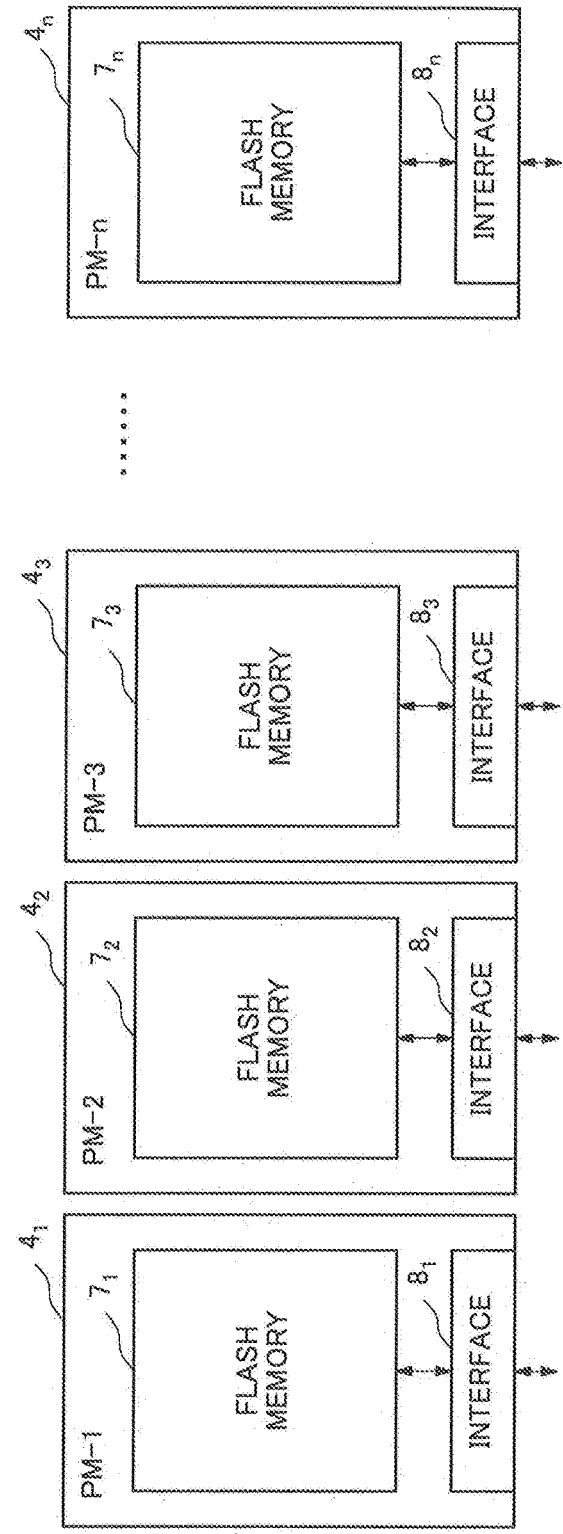
FIGS. 5A and 5B are block diagrams for illustrating details of a software storage in an operation system according to a second example embodiment of the present invention.
Figure 5B:
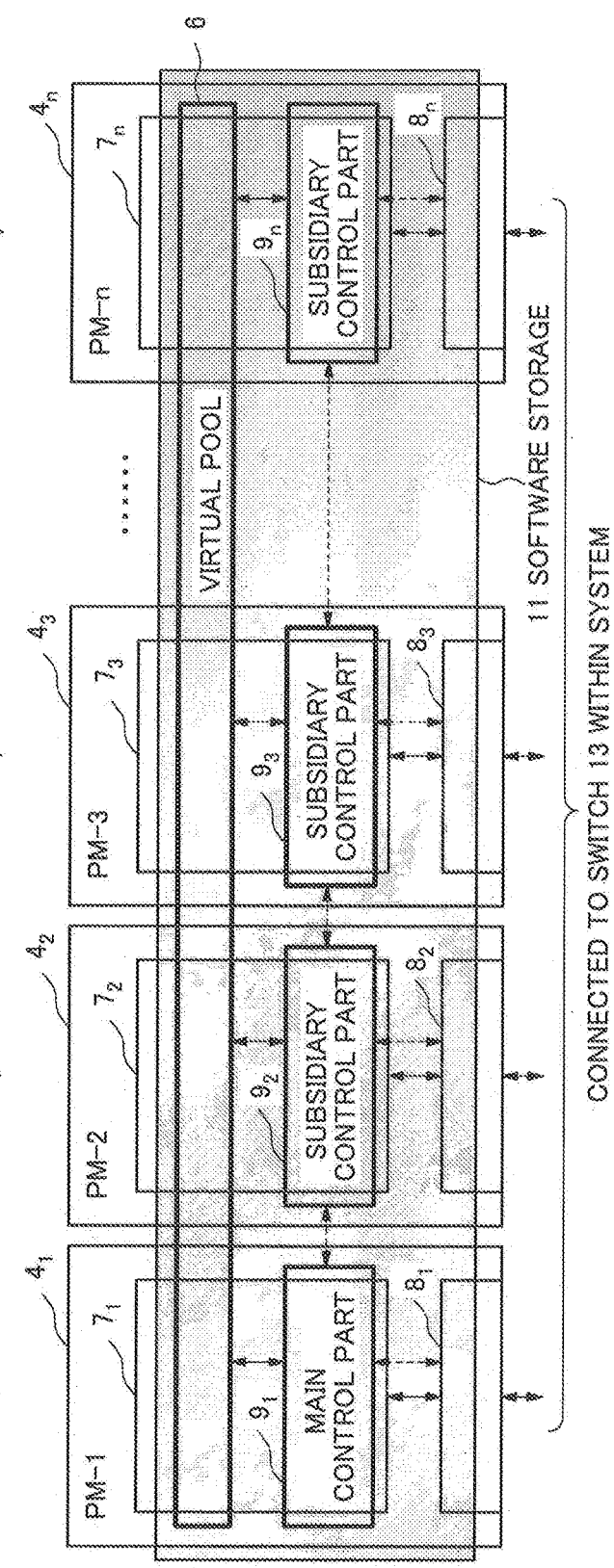

Next, a description will be given of a software storage unit and a backup method according to a second example embodiment of the present invention. FIGS. 5A and 5B FIGS. 5(*a*) and 5(*b*) are block diagrams for illustrating details of a software storage of an operation system according to the second example embodiment of the present invention. FIG. 6 is a sequence chart for illustrating a backup method according to the second example embodiment of the present invention.

A system configuration of the present example embodiment is basically the same as, but different in software storage configuration from, that of the first example embodiment shown in FIG. 2. That is, the present example embodiment is different in that the control part 5 of the software storage 11 of the first example embodiment shown in FIG. 3B is replaced with a configuration including a main control part $9_1$ and subsidiary control parts $9_2$ to $9_n$ as shown in FIG. 5B.

A system of an example embodiment of the present invention to which a backup method of the present example embodiment is applied is similar to the system of the first example embodiment shown in FIG. 2 and, accordingly, its description will be omitted.

In the present example embodiment, in FIGS. 5A and 5B, a software storage 11 is constructed by installing software across n-number of physical machines (PM-1 to PM-n) $4_1$ to $4_n$. Here, n may be any natural number equal to or larger than 2.

As shown in FIG. 5A, the n-number of physical machines $4_1$ to $4_n$ include, respectively, flash memories $7_1$ to $7_n$ and also include, respectively, interfaces $8_1$ to $8_n$.

The software storage 11 of the present example embodiment is a software storage which is constructed, similarly to that of the first example embodiment, by installing the software storage across the n-number of physical machines (PM-1 to PM-n) $4_1$ to $4_n$. The software storage 11 of the present example embodiment includes, similarly to that of the first example embodiment, a virtual pool 6 constructed across the n-number of physical machines (PM-1 to PM-n) $4_1$ to $4_n$. In the present example embodiment, the software storage 11 further includes a main control part $9_1$ constructed in the physical machine $4_1$, among the n-number of physical machines, and also includes subsidiary control parts $9_2$ to $9_n$ constructed in respective ones of the (n−1)-number of physical machines $4_2$ to $4_n$ among the n-number of physical machines.

In the present example embodiment, the virtual pool 6 is created on the flash memories $7_1$ to $7_n$ provided in the n-number of physical machines (PM-1 to PM-n) $4_1$ to $4_n$, by a user's issuing a command to the main control part $9_1$ of the software storage 11. The main control part $9_1$ and the subsidiary control parts $9_2$ to $9_n$ are connected with each other within the software storage 11. Hardware configurations of the physical machines (PM-1 to PM-n) $4_1$ to $4_n$ are the same as those of the physical machines (PM-1 to PM-n) $4_1$ to $4_n$ of the first example embodiment and, accordingly, their descriptions will be omitted.

The software storage 11 of the present example embodiment usually writes and thereby stores data operated in the operation system 1 into the virtual pool 6 via the main control part $9_1$, according to a command from a user or the server 12.

In the present example embodiment, according to a command from a user or the server 12, or according to timing set to the software storage 11, the main control part $9_1$ inquires the virtual pool 6 about a total amount of backup target data. Then, a data volume obtained by dividing the total amount of backup target data thus acquired by the number of the physical machines (PM-1 to PM-n) n is determined to be a data amount to be transmitted by each of the interfaces $8_1$ to $8_n$ of the respective physical machines (PM-1 to PM-n) $4_1$ to $4_n$.

Subsequently, the main control part $9_1$ notifies each of the subsidiary control parts $9_2$ to $9_n$ of its assigned area and amount of data to transmit. Specifically, the main control part $9_1$ notifies the subsidiary control part $9_2$, which issues a data transmission instruction to the interface $8_2$ of the physical machine (PM-2) $4_2$, of the assigned area and amount of data to transmit. Similarly, the main control part $9_1$ notifies the subsidiary control part $9_3$, which issues a data transmission instruction to the interface $8_3$ of the physical machine (PM-3) $4_3$, of the assigned area and amount of data to transmit. Similarly, the main control part $9_1$ notifies the subsidiary control part $9_n$, which issues a data transmission instruction to the interface $8_n$ of the physical machine (PM-n) $4_n$, of the assigned area and amount of data to transmit.

Subsequently, from the virtual pool 6, the main control part $9_1$, the subsidiary control part $9_2$, . . . and the subsidiary control part $9_n$ read their respective assigned data to transmit in order of the main control part $9_1$, the subsidiary control part $9_2$, . . . and the subsidiary control part $9_n$. Then, from the main control part $9_1$ to the interface $8_1$, from the subsidiary control part $9_2$ to the interface $8_2$, . . . and from the subsidiary control part $9_n$ to the interface $8_n$, a data transmission instruction is issued, and data to be transmitted by each of the interfaces $8_1$ to $8_n$ is handed over to each of the interfaces $8_1$ to $8_n$. Thereby, all of the interfaces $8_1$ to $8_n$ of the physical machines (PM-1 to PM-n) $4_1$ to $4_n$ start transmission of data used in the operation system 1 stored in the virtual pool 6, toward the software storage 21 of the backup system 2 concurrently at the same timing.

(Operation)

Next, using the sequence chart in FIG. 6, operation of the backup technique of the present example embodiment will be described in detail.

Here, a description will be given of operation since a command to perform data backup is issued from the server 12 of the operation system 1 to the main control part $9_1$ of the software storage 11 until data transmission toward the software storage 21 of the backup system 2 is performed. That is, the description will be given of operation in which the interfaces $8_1$ to $8_n$ of the physical machines (PM-1 to PM-n) $4_1$ to $4_n$ having received a data transmission instruction from, respectively, the main control part $9_1$ and the subsidiary control parts $9_2$ to $9_n$ receive data from, respectively, the main control part $9_1$ and the subsidiary control parts $9_2$ to $9_n$ having read data stored in the virtual pool 6, and perform data transmission concurrently at the same timing.

In a case where the backup instruction is issued from a user, operation performed after the issue of the command is the same and, accordingly, a description of that case will be omitted. Further, while FIG. 6 illustrates a technique of backing up data from the operation system 1 into the backup system 2, operation of a technique for backup in the reverse direction is the same, similarly to the first example embodiment, and accordingly, its description also will be omitted. Further, in a case where timing to perform data backup is set to the software storage 11, operation performed after that timing is the same and, accordingly, its description of also will be omitted.

First, to the main control part $9_1$ of the software storage 11, the server 12 of the operation system 1 transmits a backup instruction to transmit data stored in the virtual pool 6 of the software storage 11 to the software storage 21 of the backup system 2 (S11). The main control part $9_1$ having received the backup instruction transmits a data check to the virtual pool 6 in order to identify where in the virtual pool 6 and in what amount the backup target data is stored, and the virtual pool 6 replies, in a check response, an amount of the backup target data (S12). The main control part $9_1$ having received the check response identifies a storage area and a total amount of the backup target data, and calculates a data volume by dividing the total amount of backup target data by the number of all physical machines (PM-1 to PM-n) n (S13). The calculated volume is a data amount whose transmission is to be performed by each of the interfaces $8_1$ to $8_n$.

Subsequently, the main control part $9_1$ notifies each of the subsidiary control parts $9_2$ to $9_n$ of its assigned area and amount of data to transmit (S14). Then, the main control part $9_1$ transmits a data read to the virtual pool 6 and, through a read response from the virtual pool 6, acquires backup target data which is to be managed by the main control part $9_1$. Next, the main control part $9_1$, the subsidiary control part $9_2$, the subsidiary control part $9_3$, . . . and the subsidiary control part $9_n$ each transmit, a data read to the virtual pool 6, and the subsidiary control parts $9_2$ to $9_n$ acquire, through a read response from the virtual pool 6, their respective assigned backup target data (S15). At the present stage, it is not necessary for the main control part $9_1$ to confirm whether all the backup target data has been acquired.

Subsequently, to the interface $8_1$ of the physical machine (PM-1) $4_1$, the main control part $9_1$ issues a data transmission instruction and hands over data to be transmitted by the interface $8_1$. Thereby, the part of the entire backup target data which was read from the virtual pool 6 is transmitted from the interface $8_1$ of the physical machine (PM-1) $4_1$. At the same timing, to the interface $8_2$ of the physical machine (PM-2) $4_2$, the subsidiary control part $9_2$ issues a data transmission instruction and hands over data to be transmitted by the interface $8_2$. Thereby, the part of the entire backup target data which was read from the virtual pool 6 is transmitted from the interface $8_2$ of the physical machine (PM-2) $4_2$. Further, at the same timing in a similar manner, to the interfaces $8_3$ to $8_n$ of the physical machines (PM-3 to PM-n) $4_3$ to $4_n$, respectively, the subsidiary control parts $9_3$ to $9_n$ issue a data transmission instruction and hand over data to be transmitted by the interfaces $8_3$ to $8_n$. (S16). Thereby, the parts of the entire backup target data which were read from the virtual pool 6 are transmitted from, respectively, the interfaces $8_3$ to $8_n$ of the physical machines (PM-3 to PM-n) $4_3$ to $4_n$.

Each of the interfaces $8_1$ to $8_n$ of the physical machines (PM-1 to PM-n) $4_1$ to $4_n$ having received the transmission instructions starts data transmission concurrently to a designated transmission destination (S17). The switch 13 of the operation system 1 transmits the data having been transmitted to it from the interfaces $8_1$ to $8_n$ of the physical machines (PM-1 to PM-n) $4_1$ to $4_n$, to the network 3, destining the data for the software storage 21 of the backup system 2 (S18).

Subsequently, the main control part $9_1$ of the software storage 11 checks whether each of the main control part $9_1$ and the subsidiary control parts $9_2$ to $9_n$ has read all the backup target data assigned thereto from the virtual pool 6 and has issued a transmission instruction associated with the read backup target data, to the corresponding one of the interfaces $8_1$ to $8_n$ (S19). The present system is configured such that, at the present stage, the main control part $9_1$ confirms whether all the backup target data has been read from the virtual pool 6. At the same time, the main control part $9_1$ confirms whether the issuing of the transmission instructions (S16) have been surely performed. According to the check, if transmission of the entire backup target data has not been completed yet, the main control part $9_1$ proceeds to (A) of the sequence, performs the operations of S15 to S18, and checks again whether transmission of the entire backup target data has been completed. According to the check, if the transmission has not been completed yet, the operations of S15 to S19 are repeatedly performed and, when completion of the transmission of the entire backup target data is confirmed, the backup operation ends. In the above-described way, all the data in the virtual pool 6 of the software storage 11 is transmitted, and writing of the data into the virtual pool of the software storage 21 is completed.

Advantageous Effects

As has been described above, in the software storage unit and the backup method of the present example embodiment, advantageous effects described below are achieved.

A first effect is that, similarly to the first example embodiment, by using, for data transmission in backup operation, each of the interfaces of the n-number of physical machines configured to be bases of the software storage, it becomes possible to yield high throughput performance in terms of a software storage.

A second effect is that backup operation can be completed in a shorter time than a storage of the background art even when a total amount (volume) of backup target data is large. It is because of the capability of yielding high throughput performance in terms of a software storage, similarly to the first example embodiment.

Further, according to the present example embodiment, after the main control part $9_1$ notifies each of the subsidiary control parts $9_2$ to $9_n$ of its assigned area and amount of data to transmit, the interfaces $8_1$ to $8_n$ of the physical machines (PM-1 to PM-n) $4_1$ to $4_n$ each start data transmission to a designated transmission destination concurrently. As a result, the backup target data can be transmitted to the transmission destination more surely.

Other Example Embodiments

In the above-described example embodiments, the software storage 11 has been described to be a software storage constructed by installing the software storage across the n-number of physical machines (PM-1 to PM-n) $4_1$ to $4_n$. However, the software storage may be configured such that an additional physical machine can be installed, and the added physical machine also can be incorporated into the software storage. For example, the software storage may be configured such that a (n+1)-th physical machine (PM-n+1) can be installed in addition to the n-number of physical machines (PM-1 to PM-n) $4_1$ to $4_n$ and the added physical machine (PM-n+1) also can be incorporated into the software storage. Thus, installing the additional physical machine, an interface of the physical machine (PM-n+1) capable of transmitting backup target data also can be used. It may also be enabled to increase the splitting number of a total amount of backup target data and accordingly yield higher throughput performance than that yielded before adding the physical machine (PM-n+1).

The software storage may also be configured such that the number of additional physical machines can be increased such as by sequentially adding a (n+2)-th physical machine (PM-n+2), a (n+3)-th physical machine (PM-n+3) and ..., and the added plurality of physical machines also can be incorporated into the software storage.

The software storage may also be configured to be basically with no restriction on the number of additional physical machines which can be incorporated into the software storage. Further, even if a throughput performance of an interface of a physical machine was assumed to be 1 Gbps, there may appear in the future a physical machine with a throughput performance of 10 Gbps, 100 Gbps or higher. In view of that case, the software storage may also be configured such that physical machines in which the software storage 11 is installed can be replaced with a physical machine having an interface of higher throughput performance, or the latter physical machine can be used in addition to the former ones. Thereby, the software storage may be enabled to yield higher throughput performance.

Further, in the example embodiments of the present invention, there is no restriction on a storage medium constituting the software storage 11 or 21. Modes of data transfer from a storage medium of each of the physical machines on which the software storage 11 or 21 is constructed to a communication interface to the network 3 include transfer via a main memory of the operation system 1 and direct transfer by DMA (Direct Memory Access). Further, for the side of the backup system 2, it is only necessary to have higher reception throughput than data transmission throughput of the side of the operation system 1, but not necessary to be of the same configuration as that of the side of the operation system 1.

The software storage unit according to each of the above-described example embodiments of the present invention may be implemented also by an information processing device capable of executing a program for realizing the configuration and operation described in each of the example embodiments. The program may be distributed in the form of a computer-readable recording medium. The functions of each of the example embodiments may be implemented in a software manner by reading the program stored in such a recording medium and executing the program in an information processing device.

Figure 7:
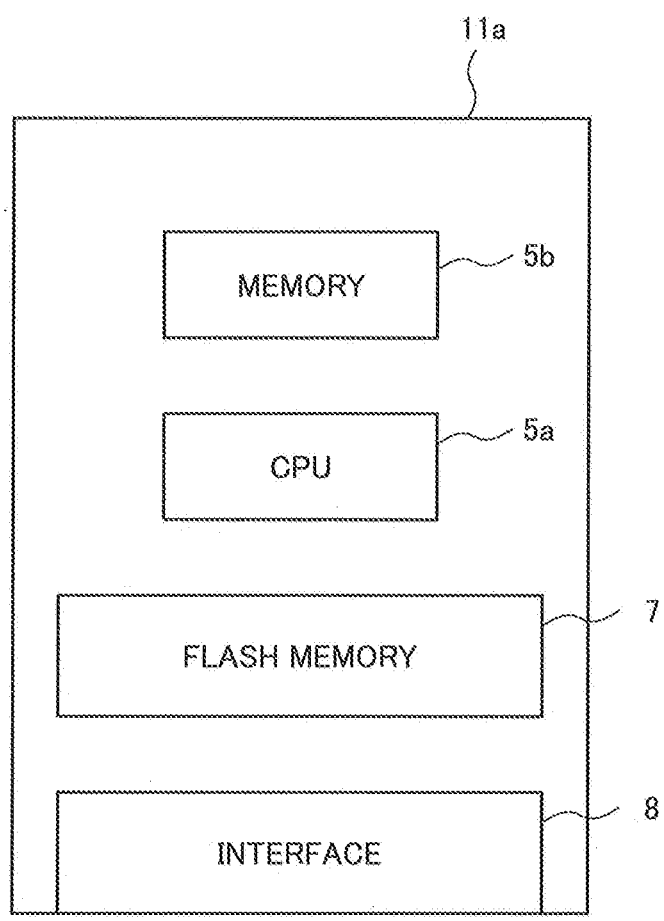
FIG. 7 is a block diagram for illustrating details of a software storage in an operation system according to another example embodiment of the present invention.
Figure 8:
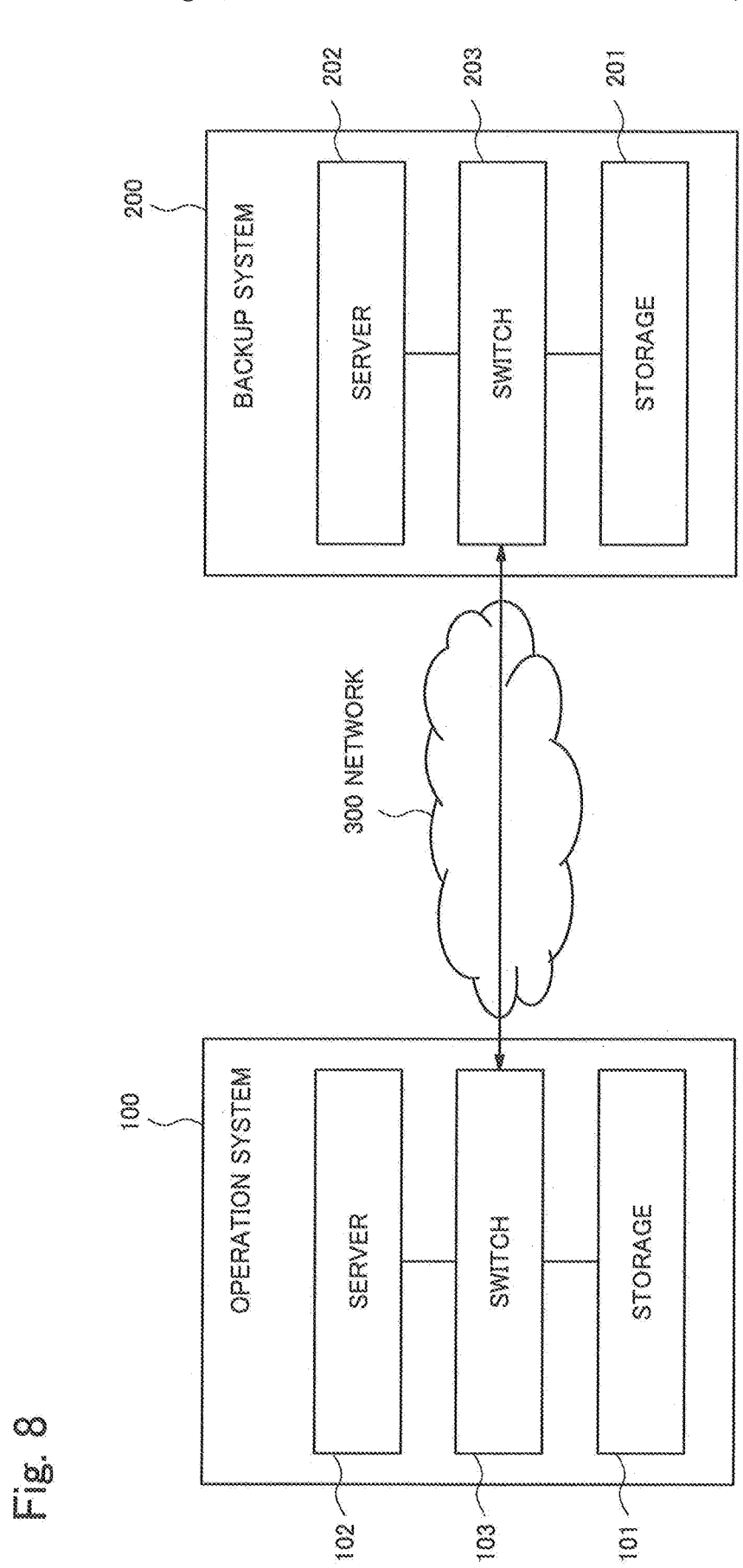
FIG. 8 is a block diagram for illustrating a system to which a backup method of background art is applied.
Figure 9:
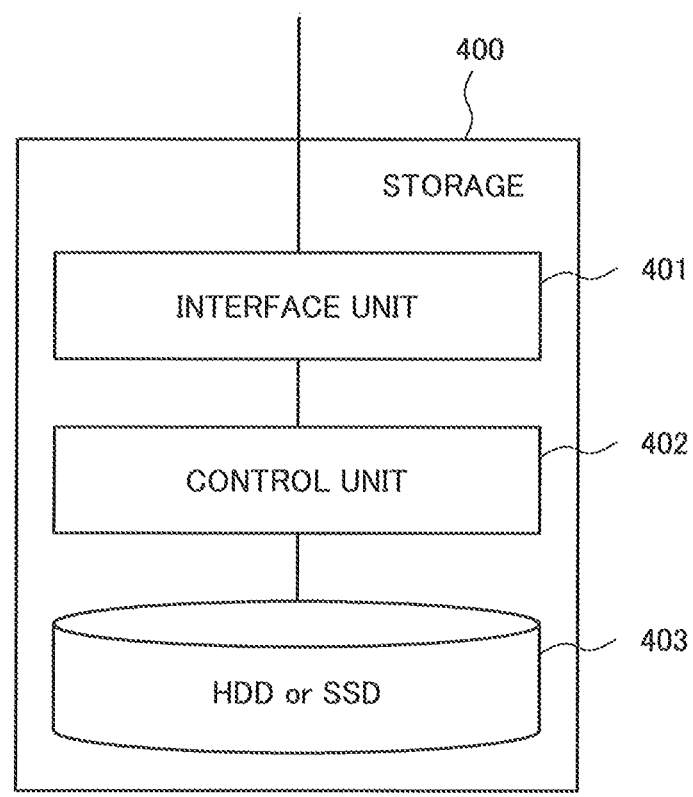
FIG. 9 is a block diagram for illustrating a configuration of the operation system to which the backup method of background art is applied.

FIG. 7 is a block diagram for illustrating details of a software storage of an operation system according to another example embodiment of the present invention. An information processing device 11a in FIG. 7 includes a CPU 5a, a memory 5b, a flash memory 7 and an interface 8. By the information processing device 11a with such a hardware configuration, the software storage unit of each of the example embodiments of the present invention may be implemented. That is, it is only necessary to configure such that the CPU 5a is caused to execute a process of identifying backup target data which is to be transferred to a data backup destination, a process of splitting the identified data into a plurality of data parts, and a process of commanding a plurality of physical machines to transfer respective ones of the split data parts to the data backup destination. A program for causing the CPU 5a to execute the processes may be distributed in the form of a recording medium storing the program. The program may be distributed in the form of a general semiconductor storage device such as a CF (Compact Flash (registered trademark)) and an SD (Secure Digital), a magnetic storage medium such as a flexible disk, an optical storage medium such as a CD-ROM (Compact Disc Read Only Memory), or the like.

Finally, in summary, an example embodiment of the present invention is characterized by, for example, providing a backup technique with improved throughput performance enabling to complete transferring entire data in a shorter time than a storage using an HDD/SSD even when a total amount of backup target data is as large a volume as about a few terabytes (TB), by using as a base a software storage based on a storage virtualization technology by software, using each of interfaces of respective ones of a plurality of physical machines (PMs) in which the software storage is installed, and transmitting data used in an operation system, which is stored in a virtual pool of the software storage, from each of the interfaces of the physical machines concurrently to a backup system.

While the preferable example embodiments of the present invention have been described above, the present invention is not limited to those example embodiments. It should be obvious that various changes and modifications may be made within the scope of the present invention described in appended claims and that any of such changes and modifications is embraced within the scope of the present invention.

Part or the whole of the above-described exemplary embodiments can be described as, but is not limited to, the following supplementary notes.

(Supplementary Note 1)

A software storage unit comprising: a software storage section constructed across a plurality of physical machines; and a switch section to be connected to an external network wherein the software storage section is configured to identify backup target data to be transferred to a data backup destination among data stored therein, split the identified data into a plurality of data parts, and issue a command to transfer the split data parts from respective ones of the plurality of physical machines to the data backup destination via the switch section.

(Supplementary Note 2)

The software storage unit according to supplementary note 1, wherein the software storage section further includes a virtual pool part constructed across the plurality of physical machines and configured to store data.

(Supplementary Note 3)

The software storage unit according to supplementary note 2, wherein control parts include a main control part and a subsidiary control part.

(Supplementary Note 4)

The software storage unit according to supplementary note 3, wherein the main control part of the control parts controls data storage in the virtual pool part and, when transferring the backup target data to the data backup destination, commands the subsidiary control part to transfer the split data parts from one of the plurality of physical machines to the data backup destination via the switch section.

(Supplementary Note 5)

The software storage unit according to supplementary note 3 wherein a plurality of the subsidiary control parts is included, and the main control part of the control parts controls data storage in the virtual pool part and, when transferring the backup target data to the data backup destination, commands each of the plurality of subsidiary control parts to transfer the split data parts from one of the plurality of physical machines to the data backup destination via the switch section.

(Supplementary Note 6)

The software storage unit according to any one of supplementary notes 1 to 5, wherein installation of an additional physical machine is enabled, and the software storage section is constructed across the plurality of physical machines including an additionally installed physical machine.

(Supplementary Note 7)

The software storage unit according to any one of supplementary notes 1 to 5, wherein the plurality of physical machines includes a reserve physical machine, and the software storage section is constructed across the plurality of physical machines including the reserve physical machine.

(Supplementary Note 8)

The software storage unit according to any one of supplementary notes 1 to 7, wherein the split data parts are transferred concurrently to the data backup destination from the plurality of physical machines.

(Supplementary Note 9)

The software storage unit according to any one of supplementary notes 1 to 8, wherein the plurality of physical machines each include a flash memory for storing data and an interface for inputting and outputting data.

(Supplementary Note 10)

A data backup method comprising: splitting backup target data into a plurality of data parts when transferring the backup target data to a data backup destination, the backup target data being data to back up among data stored in a software storage constructed across a plurality of physical machines; and transferring the split data parts from respective ones of the plurality of physical machines to the data backup destination.

(Supplementary Note 11)

The data backup method according to supplementary note 10, wherein the backup target data is split by a number of the plurality of physical machines.

(Supplementary Note 12)

A recording medium storing a backup control program for performing control to transfer backup target data to a backup destination, the backup target data being data to back up among data stored in a software storage constructed across a plurality of physical machines, the backup control program causing a computer to execute: a process of identifying the backup target data to be transferred to the data backup destination; a process of splitting the identified data into a plurality of data parts; and a process of issuing a command to transfer the split data parts from respective ones of the plurality of physical machines to the data backup destination.

(Supplementary Note 13)

The recording medium storing a backup control program according to supplementary note 12, wherein the process of splitting the identified data into a plurality of data parts is a process of splitting the backup target data by a number of the plurality of physical machines.

The present invention has been described above, taking the above-described example embodiments as exemplified examples. However, the present invention is not limited to the above-described example embodiments. That is, to the present invention, various aspects which can be understood by those skilled in the art may be applied within the scope of the present invention.

This application is based upon and claims the benefit of priority from Japanese Patent Application No. 2015-228585, filed on Nov. 24, 2015, the disclosure of which is incorporated herein in its entirety by reference.

REFERENCE SIGNS LIST

1 Operation system
2 Backup system
12, 22 Server
13, 23 Switch
11, 21 Software storage
$4_1$ to $4_n$ Physical machine
5 Control part
5a CPU
5b Memory
6 Virtual pool
$7_1$ to $7_n$, 7 Flash memory
$8_1$ to $8_n$, 8 Interface
$9_1$ Main control part
$9_2$ to $9_n$ Subsidiary control part
110 Software storage unit
111 Switch unit
112 Software storage unit
113 Virtual pool part
115 Physical machine

What is claimed is:

1. A software storage unit comprising:
a software storage part constructed across a plurality of physical machines; and a switch unit to be connected to an external network,
wherein the software storage part is configured to identify backup target data to be transferred to a data backup destination among data stored therein, split the identified data into a plurality of data parts, and issue a command to transfer the split data parts from respective ones of the plurality of physical machines to the data backup destination via the switch unit,
where the software storage part further includes a virtual pool part constructed across the plurality of physical machines and configured to store data,
wherein the software storage part includes control parts constructed across the plurality of physical machines, and the control parts include a main control part and a subsidiary control pan, and
wherein the main control part of the control parts controls data storage in the virtual pool part and, when transferring the backup target data to the data backup destination, commands the subsidiary control part to transfer the split data parts from one of the plurality of physical machines to the data backup destination via the switch unit.

2. The software storage unit according to claim 1, wherein installation of an additional physical machine is enabled, and the software storage part is constructed across the plurality of physical machines including an additionally installed physical machine.

3. The software storage unit according to claim 1, wherein the plurality of physical machines includes a reserve physical machine, and the software storage part is constructed across the plurality of physical machines including the reserve physical machine.

4. The software storage unit according to claim 1, wherein the split data parts are transferred concurrently to the data backup destination from the plurality of physical machines.

5. The software storage unit according to claim 1, wherein the plurality of physical machines each include a flash memory for storing data and an interface for inputting and outputting data.

6. A software storage unit comprising:
a software storage part constructed across a plurality of physical machines; and a switch unit to be connected to an external network,
wherein the software storage part is configured to identify backup target data to be transferred to a data backup destination among data stored therein, split the identified data into a plurality of data parts, and issue a command to transfer the split data parts from respective ones of the plurality of physical machines to the data backup destination via the switch unit,
where the software storage part further includes a virtual pool part constructed across the plurality of physical machines and configured to store data, and
wherein
the software storage part includes control parts constructed across the plurality of physical machines,
the control parts include a main control part and a plurality of subsidiary control parts, and
the main control part of the control parts controls data storage in the virtual pool part and, when transferring the backup target data to the data backup destination, commands each of the plurality of subsidiary control parts to transfer the split data parts from one of the plurality of physical machines to the data backup destination via the switch unit.

7. A data backup method comprising:
identifying backup target data to be transferred to a data backup destination;
splitting the backup target data into a plurality of data parts when transferring the backup target data the data backup destination, the backup target data being data to back up among data stored in a software storage constructed across a plurality of physical machines;
transferring the split data parts from respective ones of the plurality of physical machines to the data backup destination;
controlling a virtual pool part of a software storage part constructed across the plurality of physical machines to store data; and
controlling a data storage in the virtual pool part and a subsidiary control part in the software storage part to, when transferring the backup target data to the data backup destination, transfer the split data parts from one of the plurality of physical machines to the data backup destination via a switch unit connected to an external network.

8. The data backup method according to claim 7, wherein the backup target data is split by a number of the plurality of physical machines.

9. A non-transitory computer-readable recording medium storing a backup control program for performing control to transfer backup target data to a backup destination, the backup target data being data to back up among data stored in a software storage constructed across a plurality of physical machines,
   the backup control program causing a computer to execute:
   a process of identifying the backup target data to be transferred to the data backup destination;
   a process of splitting the identified data into a plurality of data parts;
   a process of issuing a command to transfer the split data parts from respective ones of the plurality of physical machines to the data backup destination;
   a process of controlling a virtual pool part of a software storage part constructed across she plurality of physical machines to store data; and
   a process of controlling a data storage in the virtual pool part and a subsidiary control part in the software storage past to, when transform the backup target data to the data backup destination, transfer the split data parts from one of the plurality of physical machines to the data backup destination via a switch unit connected to an external network.

10. The non-transitory computer-readable recording medium storing a backup control program according to claim 9, wherein the process of splitting the identified data into a plurality of data parts is a process of splitting the backup target data by a number of the plurality of physical machines.

\* \* \* \* \*